United States Patent
Alfares (10) Patent No.: US 8,046,316 B2
(45) Date of Patent: Oct. 25, 2011

(54) CYCLIC COMBINATORIAL METHOD AND SYSTEM

(75) Inventor: Hesham K. Alfares, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 1130 days.

(21) Appl. No.: 11/878,139

(22) Filed: Jul. 20, 2007

(65) Prior Publication Data

US 2009/0024368 A1    Jan. 22, 2009

(51) Int. Cl.
    G06F 17/00 (2006.01)
    G06N 5/00 (2006.01)
(52) U.S. Cl. .......................................... 706/45
(58) Field of Classification Search ...................... 706/45
    See application file for complete search history.

(56) References Cited

U.S. PATENT DOCUMENTS

| | | | |
|---|---|---|---|
| 5,764,858 | A | 6/1998 | Sheu et al. |
| 6,031,984 | A | 2/2000 | Walser |
| 6,182,014 | B1 | 1/2001 | Kenyon et al. |
| 6,418,398 | B1 | 7/2002 | Dueck et al. |
| 6,785,736 | B1 | 8/2004 | Barillaud |
| 6,961,685 | B2 | 11/2005 | Sy |
| 7,043,446 | B1 | 5/2006 | Dietrich et al. |
| 7,054,757 | B2 | 5/2006 | Agrafiotis et al. |
| 7,065,510 | B2 | 6/2006 | Shackleford |
| 2002/0004792 | A1 | 1/2002 | Busa |
| 2002/0008657 | A1 | 1/2002 | Poore, Jr. |
| 2002/0111780 | A1 | 8/2002 | Sy |
| 2002/0174021 | A1 | 11/2002 | Chu et al. |
| 2003/0093391 | A1 | 5/2003 | Shackleford |
| 2004/0051057 | A1 | 3/2004 | Yoshida |
| 2005/0097559 | A1 | 5/2005 | He |
| 2006/0026175 | A1 | 2/2006 | Aggarwal |

OTHER PUBLICATIONS

K. Cattell et al., Fast Algorithms to Generate Necklaces, Unlabeled Necklaces, and Irreducible Polynomials over GF(2), Journal of Algorithms, 37, pp. 267-282 (2000).*

H. Alfares and S. Selim, "A Cyclic Selection Algorithm with Scheduling Applications", The 6th Saudi Engineering Conference, KFUPM, Dhahran, Dec. 2002, pp. 513-520.* http://www.q2s.ntnu.no/publications/open/2004/Paper_rev/2004_wittner_DAA.pdf#search='distributed%20asynchronous%20heegaard' "Distributed Asynchronous Algorithm for Cross-Entropy-Based Combinatorial Optimization" by P. Heegaard, et al. retrieved on Oct. 25, 2006.

Alfares, H.K. (1998), An efficient two-phase algorithm for cyclic days-off scheduling, *Computers & Operations Research*, 25, 11,913-923.

(Continued)

*Primary Examiner* — Jeffrey A Gaffin
*Assistant Examiner* — Vincent Gonzales
(74) *Attorney, Agent, or Firm* — Richard C. Litman (57) ABSTRACT

The cyclic combinatorial method and system includes an optimizing programming method embodied in a computing machine in order to provide the capability to solve cyclic optimization problems. The method can be used to solve optimization problems having cyclic 0-1 matrices, such as network problems and cyclic workforce scheduling. The method identifies cyclically distinct solutions by enumerating cyclically distinct combinations of basic dual variables. The method can determine how many cyclically distinct combinations of m ($m \leq n$) objects can be selected, given n cyclic objects. The method integrates partition and cyclic permutation operations in order to generate cyclically distinct selections (solutions). After cyclically enumerating all dual solutions, rules are described for recognizing the set of dominant solutions. A class of problems, which includes cyclic labor scheduling, can be efficiently solved using the cyclic combinatorial method and system.

13 Claims, 5 Drawing Sheets

OTHER PUBLICATIONS

Alfares, H.K. (2000a), Dual-based optimization of cyclic three-day workweek scheduling, *Asia-Pacific Journal of Operational Research*, 17,2, 137-148.

Alfares, H.K. (2000b), Dual-based optimization of cyclic four-day workweek scheduling, *IMA Journal of Mathematics Applied in Business & Industry*, 11, 4, 269283.

https://dspace.mit.edu/handle/1721.1/8526 "Cyclic Exchange and Related Neighborhood Structures for Combinatorial Optimization Problems" by D. Sharma retrieved on Oct. 25, 2006.

http://www.optimization-online.org/DB_FILE/2002/04/465.pdf "Solving Stability Problems on a Superclass of Interval Graphs" by C. Mannino, et al. retrieved on Oct. 25, 2006.

Alfares, H.K. (2001), Efficient optimization of cyclic labor days-off scheduling, *OR Spektrum*, 23, 2, 283-294.

Alfares, H.K. (2003a), Flexible four-day workweek scheduling with weekend work frequency constraints, *Computers & Industrial Engineering*, 44, 3, 325-338.

Alfares, H.K. (2003b), Compressed workweek scheduling with differing weekdays and weekends labor demands, *Asia-Pacific Journal of Operational Research*, 20, 1, 1-20.

Alfares, H.K. (2006), Compressed workweek scheduling with days-off consecutivity, weekend-off frequency, and work stretch constraints, *INFOR*, in press.

\* cited by examiner

| n \ m | 0 | 1 | 2 | 3 | 4 | 5 | 6 | 7 | 8 | 9 | 10 | 11 | 12 | ΣB(n) |
|---|---|---|---|---|---|---|---|---|---|---|---|---|---|---|
| 0 | 1 | | | | | | | | | | | | | 1 |
| 1 | 1 | 1 | | | | | | | | | | | | 2 |
| 2 | 1 | 1 | 1 | | | | | | | | | | | 3 |
| 3 | 1 | 1 | 1 | 1 | | | | | | | | | | 4 |
| 4 | 1 | 1 | 2 | 1 | 1 | | | | | | | | | 6 |
| 5 | 1 | 1 | 2 | 2 | 1 | 1 | | | | | | | | 8 |
| 6 | 1 | 1 | 3 | 3 | 3 | 1 | 1 | | | | | | | 13 |
| 7 | 1 | 1 | 3 | 4 | 4 | 3 | 1 | 1 | | | | | | 18 |
| 8 | 1 | 1 | 4 | 5 | 8 | 5 | 4 | 1 | 1 | | | | | 30 |
| 9 | 1 | 1 | 4 | 7 | 10 | 10 | 7 | 4 | 1 | 1 | | | | 46 |
| 10 | 1 | 1 | 5 | 8 | 16 | 16 | 16 | 8 | 5 | 1 | 1 | | | 78 |
| 11 | 1 | 1 | 5 | 10 | 20 | 26 | 26 | 20 | 10 | 5 | 1 | 1 | | 126 |
| 12 | 1 | 1 | 6 | 12 | 29 | 38 | 50 | 38 | 29 | 12 | 6 | 1 | 1 | 224 |

*Fig. 1*

| n \ m | 0 | 1 | 2 | 3 | 4 | 5 | 6 | 7 | 8 | 9 | 10 | 11 | 12 | ΣC(n) |
|---|---|---|---|---|---|---|---|---|---|---|---|---|---|---|
| 0 | 1 | | | | | | | | | | | | | 1 |
| 1 | 1 | 1 | | | | | | | | | | | | 2 |
| 2 | 1 | 1 | 1 | | | | | | | | | | | 3 |
| 3 | 1 | 1 | 1 | 1 | | | | | | | | | | 4 |
| 4 | 1 | 1 | 2 | 1 | 1 | | | | | | | | | 6 |
| 5 | 1 | 1 | 2 | 2 | 1 | 1 | | | | | | | | 8 |
| 6 | 1 | 1 | 3 | 4 | 3 | 1 | 1 | | | | | | | 14 |
| 7 | 1 | 1 | 3 | 5 | 5 | 3 | 1 | 1 | | | | | | 20 |
| 8 | 1 | 1 | 4 | 7 | 10 | 7 | 4 | 1 | 1 | | | | | 36 |
| 9 | 1 | 1 | 4 | 10 | 14 | 14 | 10 | 4 | 1 | 1 | | | | 60 |
| 10 | 1 | 1 | 5 | 12 | 22 | 26 | 22 | 12 | 5 | 1 | 1 | | | 108 |
| 11 | 1 | 1 | 5 | 15 | 30 | 42 | 42 | 30 | 15 | 5 | 1 | 1 | | 188 |
| 12 | 1 | 1 | 6 | 19 | 43 | 66 | 80 | 66 | 43 | 19 | 6 | 1 | 1 | 352 |

*Fig. 2*

| No. | m | SC[1] | (3,7) L | mL[2] | (4,7) L | mL[2] | (5,7) L | mL[2] |
|---|---|---|---|---|---|---|---|---|
| 1 | 0 | | | | | | | |
| 2* | 1 | $k$ | 1 | 1 | 1 | 1 | 1 | 1 |
| 3 | 2 | $k, k+1$ | 2 | 1 | 2 | 1 | 2 | 1 |
| 4 | 2 | $k, k+2$ | 2 | 1 | 2 | 1 | 2 | 1 |
| 5 | 2 | $k, k+3$ | 1 | 2 | 2 | 1 | 2 | 1 |
| 6 | 3 | $k, k+1, k+2$ | 3 | 1 | 3 | 1 | 3 | 1 |
| 7 | 3 | $k, k+2, k+3$ | 2 | 3/2 | 3 | 1 | 3 | 1 |
| 8 | 3 | $k, k+3, k+4$ | 2 | 3/2 | 2 | 3/2 | 3 | 1 |
| 9 | 3 | $k, k+2, k+4$ | 2 | 3/2 | 2 | 3/2 | 3 | 1 |
| 10 | 4 | $k, k+1, k+2, k+3$ | 3 | 4/3 | 4 | 1 | 4 | 1 |
| 11 | 4 | $k, k+1, k+2, k+4$ | 3 | 4/3 | 3 | 4/3 | 4 | 1 |
| 12 | 4 | $k, k+1, k+3, k+4$ | 2 | 2 | 3 | 4/3 | 4 | 1 |
| 13* | 4 | $k, k+1, k+3, k+5$ | 2 | 2 | 3 | 4/3 | 3 | 4/3 |
| 14 | 5 | $k, k+1, k+2, k+3, k+4$ | 3 | 5/3 | 4 | 5/4 | 5 | 1 |
| 15 | 5 | $k, k+1, k+2, k+3, k+5$ | 3 | 5/3 | 4 | 5/4 | 4 | 5/4 |
| 16 | 5 | $k, k+1, k+3, k+4, k+5$ | 3 | 5/3 | 3 | 5/3 | 4 | 5/4 |
| 17 | 6 | $k, k+1, k+2, k+3, k+4, k+5$ | 3 | 2 | 4 | 3/2 | 5 | 6/5 |
| 18* | 7 | All 7 columns | 3 | 7/3 | 4 | 7/4 | 5 | 7/5 |

(1) $k = 1, ..., 7$, all values are mod 7

(2) Shaded cells indicate dominant solutions

CYCLIC COMBINATORIAL METHOD AND SYSTEM

BACKGROUND OF THE INVENTION

1. Field of the Invention

The present invention relates to the field of solving real-world constraint problems and, more particularly, to a method and system for optimizing constraint models.

2. Description of the Related Art

Cyclic matrices are frequently encountered in optimization problems, such as network problems, the traveling salesman problem, labor scheduling problems, and certain reliability problems. An $n^{th}$-order matrix A, with elements $a(j, k) = a(k-j)$ that depend on only k-j, and that are periodic so that $a(k+n) = a(k)$, is called cyclic. Equivalence among several necessary conditions is required for a square complex matrix to be cyclic. The cyclic property of the constraint matrix can be exploited in order to develop efficient solutions of optimization problems. For example, the cyclic property of the constraint matrix can be utilized to devise models and efficient solution procedures for cyclic optimization problems.

A 0-1 vector is said to be circular if its 1's occur consecutively, where the first and last entries are considered to be consecutive. A matrix is called column (row) circular if its columns (rows) are circular.

Cyclic sequences and permutations are important problems in combinatorial theory. An example of a cyclic combinatorial problem is the necklace problem is as follows: how many distinct necklace patterns are possible with n beads, which are available in r different colors? The present invention addresses a simpler problem: how many distinct necklace patterns are possible with n beads, m of which are black, and the rest are white? If mirror image necklaces are considered equivalent, the question becomes: what is the number of bracelets (reversible necklaces) that can be formed with n black and white beads, m of which are black? Both the necklace and the bracelet problems are directly applicable to optimization problems with cyclic 0-1 matrices. The two colors of the beads correspond to O's and 1's in a cyclic 0-1 constraint coefficient matrix.

Because Integer Linear Programming (ILP) problems are known to be difficult to solve (NP hard) and have numerous applications in many areas of optimization, such as cyclic scheduling and network problems, it would be desirable to provide a method that is generally applicable to all integer linear programming (ILP) problems of the form: minimize $1^T x$, subject to $Ax \geq r$, where $x \geq 0$ and integer, and A is a cyclic 0-1 matrix.

Thus, a cyclic combinatorial method and system solving the aforementioned problems is desired.

SUMMARY OF THE INVENTION

The cyclic combinatorial method and system includes an optimizing programming method embodied in a computing machine in order to provide the capability to solve cyclic optimization problems. The method can be used to solve optimization problems having cyclic 0-1 matrices, such as network problems and cyclic workforce scheduling. The method identifies cyclically distinct solutions by enumerating cyclically distinct combinations of basic dual variables.

The method can determine how many cyclically distinct combinations of $m(m \leq n)$ objects can be selected given n cyclic objects. The method integrates partition of an integer and cyclic permutation operations in order to generate all cyclically distinct combinations of m objects that can be selected. After cyclically enumerating all dual solutions, rules are applied to identify the set of dominant solutions. A class of problems that includes cyclic labor scheduling can be efficiently solved using the cyclic combinatorial method and system of the present invention.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a programming method embodied in a computing machine that provides the capability to solve cyclic optimization problems. The method can be used to solve optimization problems having cyclic 0-1 matrices, such as network problems and cyclic workforce scheduling. The method identifies cyclically distinct solutions by enumerating cyclically distinct combinations of basic dual variables.

The method can determine how many cyclically distinct combinations of $m(m \leq n)$ objects can be selected, given n cyclic objects. The method integrates partition of an integer and cyclic permutation operations in order to generate all cyclically distinct combinations of m objects that can be selected. After cyclically enumerating all dual solutions, rules are applied to identify the set of dominant solutions. A class of problems, which includes cyclic labor scheduling, can be efficiently solved using the cyclic combinatorial method and system of the present invention.

The cyclic combinatorial optimization algorithm has two main steps. First, partition and permutation tools are combined for selecting cyclically distinct subsets out of a number of cyclic objects. Considering the columns (variables) of these matrices as cyclic objects, the algorithm can be used to select only cyclically distinct combinations of columns (basic dual variables). The process of determining these cyclic combinations is exactly equivalent to solving the necklace or the bracelet problem. Subsequently, simple rules are introduced to identify a small subset of dominant dual solutions. The dominant dual solutions can be used to calculate bounds on the objective function, impose efficient cuts on the ILP model, or even completely solve the given cyclic 0-1 optimization problem using primal-dual relationships.

Given the total number of cyclic objects n, and the number of selected objects m (m≦n), the combinatorial method provides the capability of generating all cyclically distinct combinations of m objects that can be selected, and determining a small set of dominant solutions that include an optimum solution for a given problem. The capability of generating all cyclically distinct combinations of m objects that can be selected is achieved by means of a cyclic selection procedure, which combines partition of an integer and the permutation of objects.

The partition of a positive integer n into m parts (m≦n) as a representation of n as a sum of positive integers can be expressed as:

$$n = v_1 + v_2 + \ldots + v_m \quad (1)$$

where $$v_i > 0, i = 1, \ldots m$$

Denoting the number of (unordered) partitions of n into m parts by $P_m(n)$, it is shown that:

$$P_1(n) = P_n(n) = 1, \quad (2), \text{and}$$

$$P_2(n) = \lfloor n/2 \rfloor \quad (3)$$

where $$\lfloor a \rfloor = \text{largest integer less than or equal to a.}$$

The remaining values of $P_m(n)$ can be obtained by the recursive relationship:

$$P_m(n) = P_1(n-m) + P_2(n-m) + \ldots + P_m(n-m) \quad (4)$$

The permutation of n objects can be defined as an order of the n objects. There are n! permutations of n distinct objects. A combination of n distinct objects taken m at time (an r-combination of n elements) can be defined as a selection of m of the n objects without regard to order. When the selection is made without replacement (i.e., when repetitions of the objects are not allowed), the number of r-combinations of n elements is:

$$\binom{n}{m} = \frac{n!}{m!(n-m)!} \quad (5)$$

The cyclic combinatorial method of the present invention combines partition with permutation and adds safeguards to eliminate cyclically redundant combinations. Effectively, a scheme for generating cyclically distinct permutations is applied to m partitions of an integer n. The steps of the cyclic selection procedure are briefly described as follows with reference to the flowchart of FIG. 4. Given integers n and m (m≦n), (the integers may be acquired as inputs, as shown at step 405 in FIG. 4), partition n into m parts $(v_1, v_2, \ldots, v_m)$ (at step 410 of FIG. 4) using a procedure that generates monotonic (non-decreasing or non-increasing) partitions. If n≦3, or n−m≦1, or $v_1 = v_m$ (all parts are equal), store the current combination and go to the next partition. Otherwise, fixing $v_1$, find the next permutation of the m−1 remaining parts $(v_2, \ldots, v_m)$, as indicated at step 412 of FIG. 4, and cyclically compare the resulting (current) combination (including $v_1$) with all stored combinations of the current partition, as indicated at steps 414, 416, 418, and 420.

Figure 4:
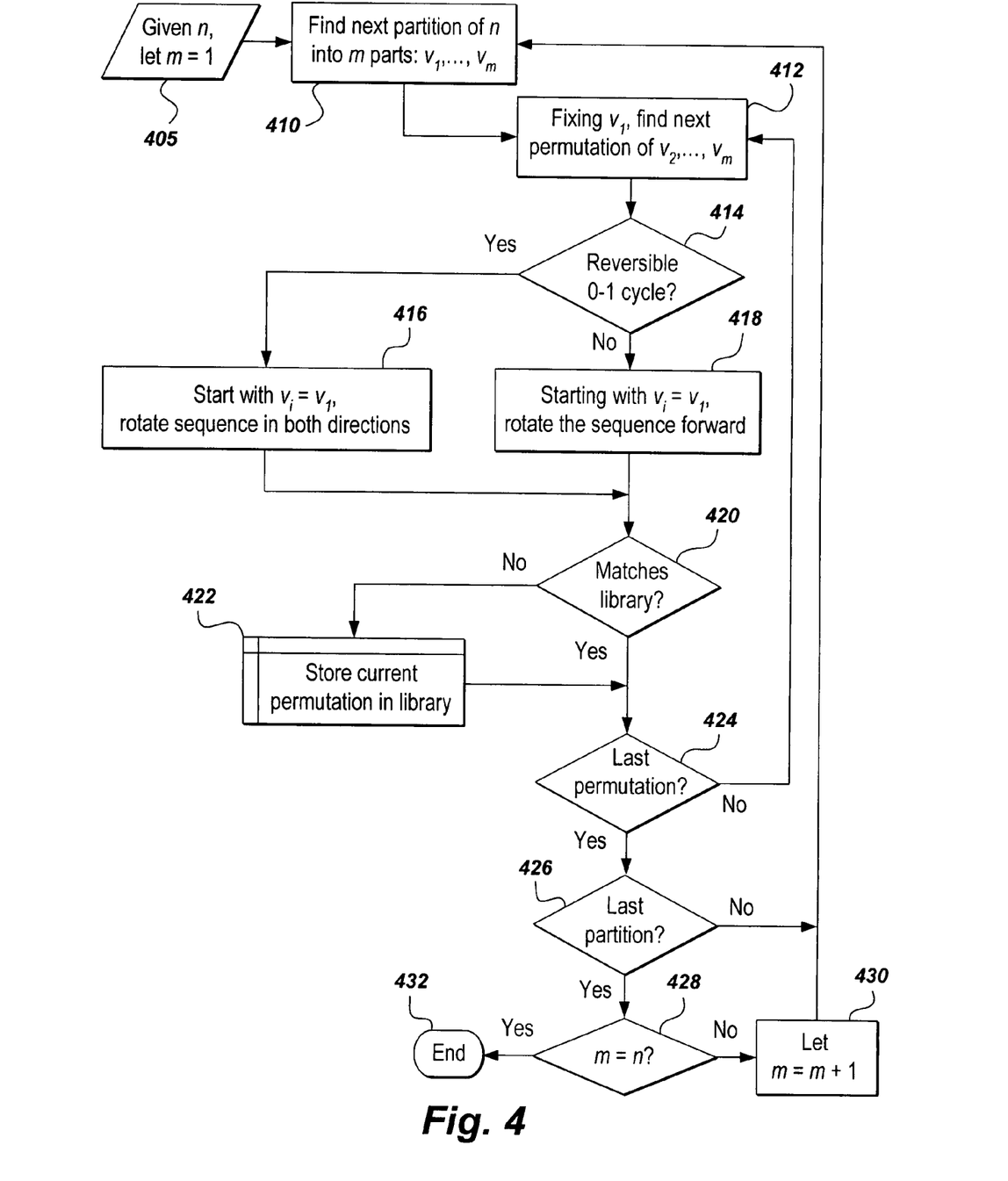
FIG. 4 is a flowchart of a cyclic selection process in a cyclic combinatorial method according to the present invention.

If there is no match, store the current combination (as indicated at step 422) and continue to the next permutation. Otherwise, the current combination is ignored, and processing is allowed to go to next permutation, as indicated at step 424 and the loop back to step 412. As shown at steps 424 and 426, for a last permutation that is also a last partition, an equality test is performed at process 428, viz., whether m=n. If so, all processing ends at step 432. Otherwise, m is incremented (at step 430), and the process is recursively repeated, beginning with partitioning n into m parts (step 410). If, at step 426, the permutation is not the last permutation in the cycle, processing resumes at step 412.

In step 410, any monotonic partition procedure can be used. The implementation of the optimization procedure uses a procedure that generates non-decreasing partitions $(1 \leq v_1 \leq v_2 \leq \ldots \leq v_m)$, beginning with n=n and ending with n=1+1+...+1. No permutation is required for the three cases specified if n≦3, or n−m≦1, or $v_1 = v_m$, because all permutations for these cases are cyclically equivalent.

In step 412, an adjacent-mark permutation procedure is used in the implementation of the optimization algorithm. For each current combination, cyclical comparisons are performed as follows. Since $v_1$ is fixed in all permutations, all sequences will start with $v_1$ (the smallest partition). Therefore, any element in the sequence whose value is equal to $v_1$ will be considered as a starting point for comparisons with previously stored permutations. For each $v_i = v_1$, i=2, ..., m, start with $v_i$ and proceed to complete the cycle, comparing the resulting sequence with all stored sequences for the current partition.

Figure 5:
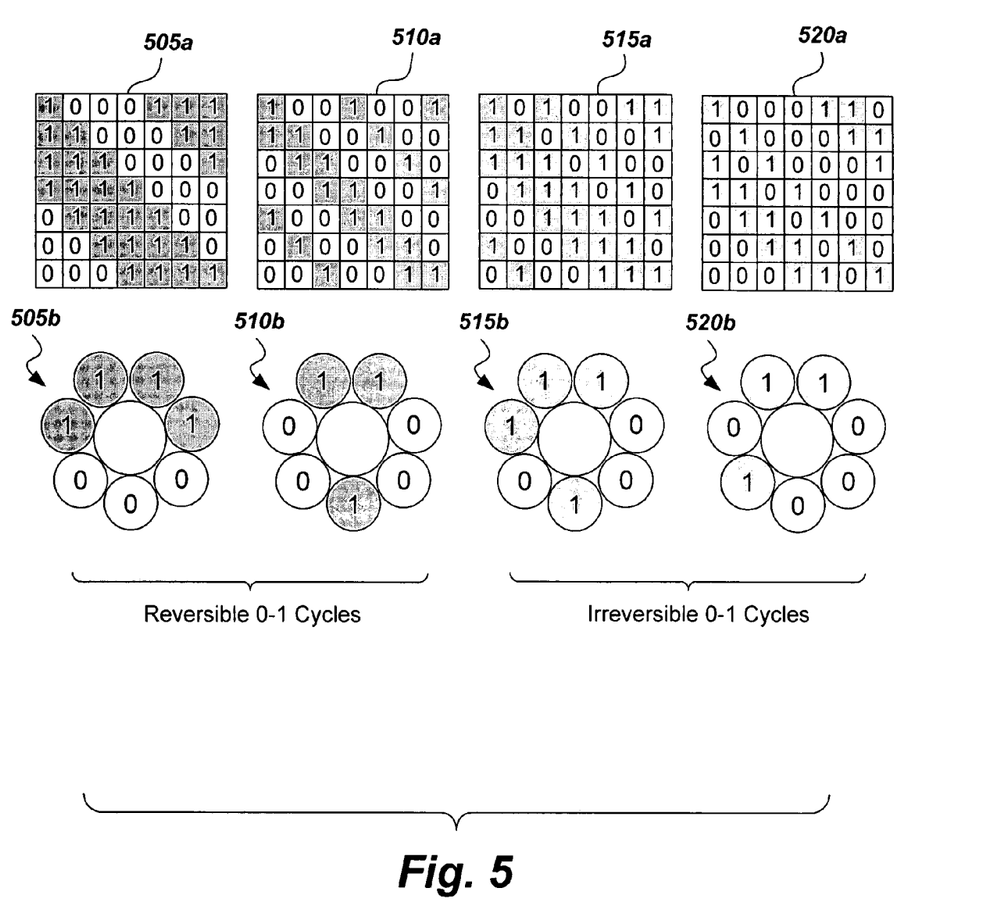
FIG. 5 is a diagram showing representations of matrices and corresponding cycles in a cyclic combinatorial method according to the present invention.

As shown at step 414 in FIG. 4, if the 0-1 matrix consists of reversible (symmetric) cycles, then it is necessary to proceed from each $v_i$ in both directions, constructing two different sequences, as indicated at step 416. The forward sequence to be compared is $(v_i, v_{i+1}, v_{i+2}, \ldots, v_m, v_1, v_2, \ldots, v_{i-1})$, while the reverse sequence is $(v_i, v_{i-1}, v_{i-2}, \ldots, v_1, v_m, v_{m-1}, v_{m-1}, \ldots, v_{i+1})$. A reversible (symmetric) 0-1 cycle can be turned over, producing the same cycle. Reversible 0-1 cycles are symmetric, i.e., the cycle can be divided into two identical (mirror image) halves. Examples of reversible (symmetric) and irreversible (asymmetric) 0-1 matrices and corresponding cycles are shown in FIG. 5 as matrices 505a, 510a, 515a and 520a and their corresponding reversible 0-1 cycles 505b and 510b and corresponding irreversible 0-1 cycles 515b and 520b. As shown at step 418 in FIG. 4, an irreversible 0-1 cycle is rotated forward, starting with $v_i = v_1$.

The case (n=7, m=4) illustrates how the cyclic selection procedure works. At step 410, three possible partitions of 7 into 4 parts $(v_1, v_2, v_3, v_4)$ are determined, namely, (1, 1, 1, 4), (1, 1, 2, 3), and (1, 2, 2, 2).

At step 412, let us consider only the second partition (1, 1, 2, 3). Thus, fixing "$v_1 = 1$", there are 3!=6 permutations of $(v_2, v_3, v_4)$, namely, (1, 1, 2, 3), (1, 1, 3, 2), (1, 2, 1, 3), (1, 2, 3, 1), (1, 3, 1, 2), and (1, 3, 2, 1).

Storing the first sequence as the first permutation, the remaining permutations are compared to it by starting from each "$v_i = 1$" and proceeding in both directions. For example, the second permutation above (1, 1, 3, 2) can be expressed as:

Forward direction: (1, 1, 3, 2), (1, 3, 2, 1)
Reverse direction: (1, 2, 3, 1), (1, 1, 2, 3).

From the forward rotation, the permutation (1, 1, 3, 2) is cyclically equivalent to (1, 3, 2, 1). Since the reverse rotation does not produce the original sequence, this permutation is not reversible. However, if the direction of rotation is ignored (reverse cycles are considered equivalent), then (1, 1, 3, 2) is also cyclically equivalent to (1, 1, 2, 3). In any case, the permutation (1, 1, 3, 2) is ignored, and the procedure then moves to check the four remaining permutations. At the end of this process, only three cyclically distinct permutations are identified for the second partition: (1, 1, 2, 3), (1, 2, 3, 1), and (1, 2, 1, 3). However, if reverse cycles are considered equivalent, then only two cyclically distinct permutations remain: (1, 1, 2, 3), and (1, 2, 1, 3).

The procedure represents each combination as a sequence of m partitions of n. Actually, these partitions are distances (differences) between successive numbers. The algorithm's representation can be converted to specific choices from the set (1, . . . , n). For example, given that n=7 and m=4, the sequence of partitions $(v_1, v_2, v_3, v_4)=(1, 2, 1, 3)$ corresponds to selecting the numbers (1,1+2,1+2+1,1+2+1+3)=(1,3,4,7) from the numbers (1, 2, . . . , 7). The selection (1,3,4,7) is cyclically equivalent to (2,4,5,1), or (7,2,3,6), and so on. Alternatively, this sequence can be represented as selecting from the cyclic set (1, . . . , 7) the numbers (k,k+1,k+1+2,k+1+2+1) mod 7, or (k,k+2,k+2+1,k+2+1+3) mod 7, and so on. As a convention, the cyclic combination $(v_i, v_2, \ldots, v_m)$ will be represented by the sequence $(k, k+v_2, k+v_2+v_3, \ldots, k+v_2+v_3+ \ldots +v_m)$ mod n, for k=1, . . . n.

As stated above, for the linear (non-cyclic) case, the number of ways m elements can be selected out of n objects is given by the well-known formula in equation (5). An a-array necklace of length n may be defined as a string of n characters, each of a possible types, where rotation is ignored, such that $(b_1 b_2 \ldots b_n)$ is equivalent to $(b_{k+1} b_{k+2} \ldots b_n \ldots b_1 b_2 \ldots b_k)$ for any k. A free or reversible necklace (one that can be turned over) is called a bracelet. For free necklaces, opposite orientations (mirror images) are regarded as equivalent, so the necklace can be picked up and flipped over. The number of such bracelets (reversible necklaces) with n beads, m of which are black and n−m are white, is given by:

$$B_m(n) = \frac{1}{2n} \sum_{d|(m,n)} \phi(d) \binom{n/d}{m/d} + \frac{1}{2}\left( \left\lfloor \frac{n - \frac{1-(-1)^m}{2}}{2} \right\rfloor \left\lfloor \frac{m}{2} \right\rfloor \right) \quad (6)$$

where $\lfloor \alpha \rfloor$ denotes the integer part of a.

In fixed necklaces, reversal of strings is respected, i.e., opposite orientations are not considered equivalent. The number of necklaces with n black and m white beads (i.e. total number of beads equal to n+m) may be defined as $\alpha_0(n,m)$. Therefore, the number of binary (two-color) necklaces with n beads of which m are black is $\alpha_0(m,n-m)$, which is given by:

$$C_m(n) = \frac{1}{n} \sum_{d|(m,n)} \phi(d) \binom{n/d}{m/d} \quad (7)$$

where $\phi(d)$=Euler's totient function, i.e., the number of numbers less than d that are coprime (have no common factor other than 1 or −1) to d. For example, $\phi(1)=|\{1\}|=1$, and $\phi(6)=|\{1,5\}|=2$.

Using the above expressions for the number of cyclic selections, simpler expressions can be determined for three special cases. The first case is when m≦3, and the second case is when n−m≦1. In both cases, no permutations are required, and the number of cyclic selections is simply the number of partitions $P_m(n)$. The third special case applies to the remaining (unselected) n−m objects. For the linear (non-cyclic) case, the number of combinations of the selected n items is equal to the number of combinations of the remaining n−m items, or $$\binom{n}{m} = \binom{n}{n-m}.$$

This is also true for the cyclic case. The three cases are summarized as follows:

$$B_m(n)=C_m(n)=P_m(n), m \leq 3, \text{ or } n-m \leq 1 \quad (8)$$

$$B_{n-m}(n)=B_m(n), C_{n-m}(n)=C_m(n) \quad (9)$$

For the remaining cases of n and m, the values of $B_m(n)$ and $C_m(n)$ must be calculated by (6) and (7), respectively. Alternatively, these values can be obtained by applying the steps of the cyclic selection procedure. In order to calculate these values, and to facilitate the implementation of these steps, the algorithm was coded as a Microsoft PowerStation® FORTRAN program named CYCLE. The program was run for a small representative sample of n and m, and the values of $B_m(n)$ and $C_m(n)$ were recorded. These values are shown in the tables shown in FIGS. 1 and 2, respectively.

Figure 6:
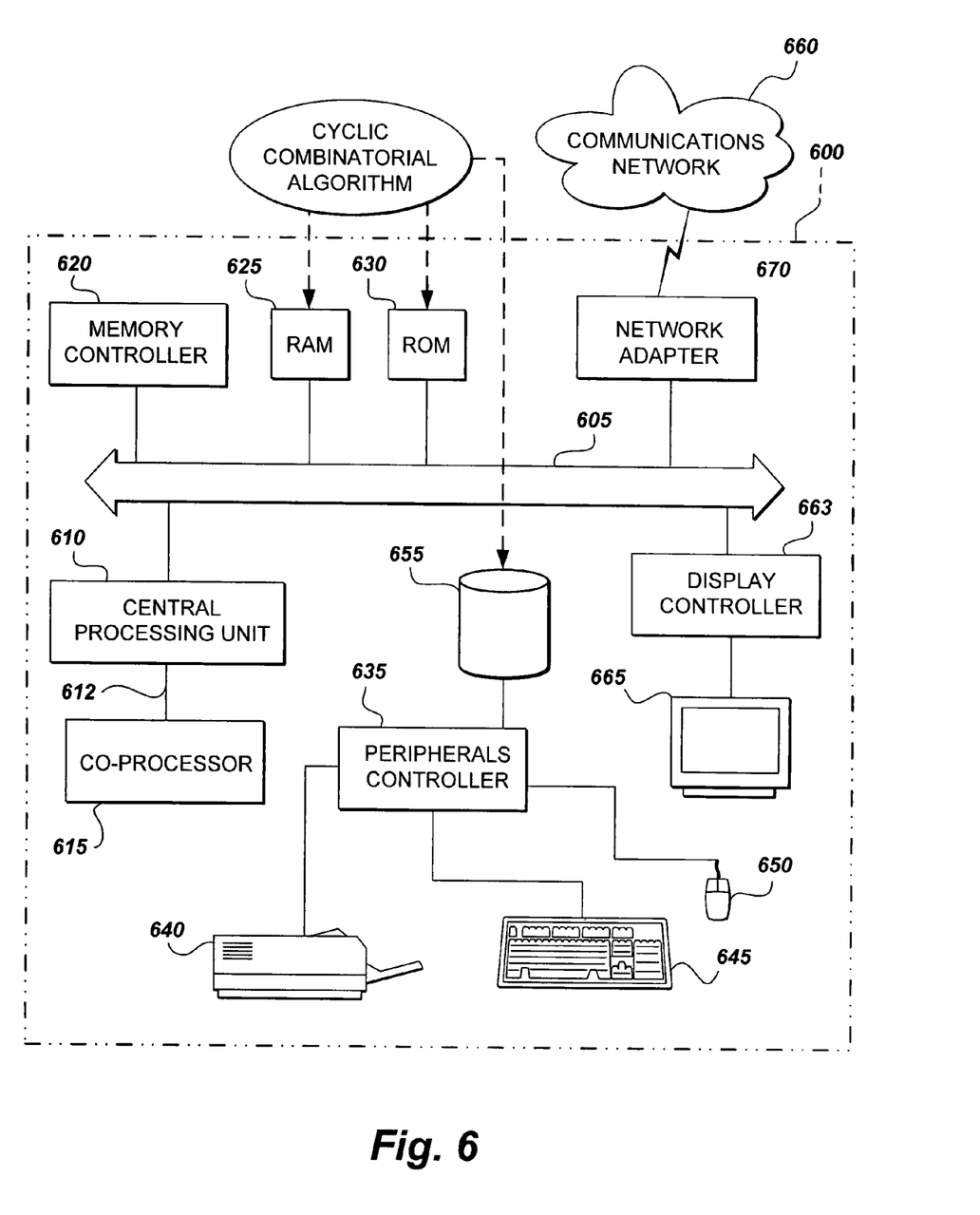
FIG. 6 is a block diagram of an exemplary system for carrying out the cyclic combinatorial method according to the present invention.

Referring to FIG. 6, an exemplary computing system 600 for implementing cyclic combinatorial optimization method of the present invention is described. Computing system 600 is capable of executing the cyclic combinatorial algorithm 400 as an application. Exemplary computing system 600 is controlled primarily by computer readable instructions, which may be in the form of software, firmware, a combination of software and firmware, or the like. Such software may be executed within central processing unit (CPU) 610 to cause system 600 to perform a useful task, such as execution of the cyclic combinatorial algorithm of the present invention. While computing system 600 may utilize a central processing unit 610 that is implemented by microelectronic chips in a general purpose, microprocessor configuration, system 600 may have a variety of computing machine architectures, such as programmable logic arrays (PLA), application specific integrated circuits (ASIC), field programmable gate arrays (FPGA), and the like. Moreover, computing environment 600 may use resources of remote CPUs through communications network 660 or other data communications means.

In the embodiment shown, a math co-processor 615 designed to perform numeric calculations more efficiently than general-purpose CPU 610 is provided to perform additional functions and/or assist CPU 610 in executing the cyclic combinatorial algorithm of the present invention. As shown in FIG. 6, CPU 610 can be connected to co-processor 615 through a bus 612.

In operation, CPU 610 fetches, decodes, and executes instructions, and transfers information to and from other resources via the computer's main data transfer path, system bus 605. The system bus 605 connects the components in computing system 600 and provides a data exchange medium. System bus 605 preferably includes data lines for data communication among/with attached devices, address lines for addressing attached devices, and control lines for polling, interrupting, controlling attached devices on the system bus 605.

Memory devices coupled to system bus 605 may include random access memory (RAM) 625, read only memory (ROM) 630, or the like. Programmed instructions implementing the cyclic combinatorial algorithm of the present invention may be stored and retrieved RAM 625, ROM 630, or stored/retrieved to/from a combination of both storage devices.

ROMs 630 generally contain stored data that cannot be modified. Alternatively, some of the data generated or used by the present invention could be stored in a ROM that is programmable for storage/retrieval of infrequently changing data.

Data stored in RAM 625 can be read or changed by CPU 610 or other hardware devices. Access to RAM 625 and/or ROM 630 may be controlled by memory controller 620. Memory controller 620 may provide an address translation function that translates virtual addresses into physical addresses as instructions are executed. Memory controller 620 may also provide a memory protection function that isolates processes within the system and isolates system processes from user processes. Thus, a program running in a user mode can normally access only memory mapped by its own process virtual address space so that it cannot access memory within the virtual address space of another process, unless permission for memory sharing between the processes has been granted.

In addition, computing system 600 may contain peripheral controller 635 responsible for communicating instructions from CPU 610 to peripherals, such as, printer 640, keyboard 645, mouse 650, and data storage device 655. Tangible results of processing according to the present invention may be stored in the data storage drive 655 and/or may be printed out on the printer 640. Moreover, programmed instructions implementing the cyclic combinatorial algorithm may be stored, in whole or in part, within the data storage drive 655.

Display 665, which is controlled by display controller 663, is used to display visual output generated by computing system 600. Such visual output may include text, graphics, animated graphics, and video. Display 665 may be implemented with a CRT-based video display, an LCD-based flat panel display, a gas plasma-based flat panel display, a touch panel, or other display forms. Display controller 663 includes electronic components required to generate a video signal that is sent to display 665. It is within the contemplation of the present invention to provide tangible results of the cyclic combinatorial algorithm via any combination of text, graphics, animated graphics, and video that can be presented on display 665.

Additionally, computing system 600 may contain network adaptor 670 that can be used to connect computing system 600 to an external communication network 660, e.g., the Internet, an intranet, or the like. Communications network 660 may provide computer users with means of communicating and transferring software implementation and results of the cyclic combinatorial algorithm electronically. Moreover, communications network 660 may provide distributed processing, which can involve a plurality of computing elements sharing the workload and cooperatively performing the cyclic combinatorial algorithm. It will be appreciated that the network connections shown are exemplary, and other means of establishing a communications link between the computers may be used.

Exemplary computer system 600 is merely illustrative of a computing environment in which the inventive problem solving methods may operate and does not limit the implementation of the herein described cyclic combinatorial algorithmic method in computing environments having differing components and configurations, as the inventive concepts described herein may be implemented in various computing environments having various components and configurations.

The cyclic selection procedure can be used as a step in an overall methodology to solve a general class of important and NP-hard cyclic optimization problems. Given an integer linear programming (ILP) problem of the form:

$$\text{Minimize } Z = 1^T x \quad (10)$$

$$\text{subject to } Ax \geq r \quad (11)$$

where $x \geq 0$ and integer, and A is a cyclic 0-1 matrix, a cyclic optimization algorithm employing the cyclic selection procedure involves the following steps.

First, ignoring integrality restrictions, the dual LP model is constructed as:

$$\text{Maximize } W = r^T y \quad (12)$$

$$\text{subject to } A^T y \leq 1 \quad (13)$$

where $y \geq 0$.

Second, all cyclically distinct solutions of the dual model are determined. To solve the dual problem we allocate the unit resource or right-hand side of dual constraints (13), which is equal to 1, among the dual variables (columns of $A^T$) in order to maximize the dual objective W. We may allocate the unit resource among any number m of selected columns, where $m=1, \ldots, n$. Since the n columns (variables) of the dual matrix $A^T$ are cyclic, the number of cyclically distinct dual solutions corresponds to the number of cyclically distinct selections of m columns (variables) out of the n cyclic columns of the matrix. It can be proven that the optimum dual values are equal. Thus, for each selection, the value of the dual variables $y_1, \ldots, y_n$ is 1 over the maximum sum (among all rows) of variables in the m selected columns. Thus, the dual solution is specified by:

$$y_i = \begin{cases} 1/L, & i \in SC \\ 0, & i \notin SC \end{cases} \quad (14)$$

$$W = \frac{1}{L} \sum_{i \in SC} r_i \quad (15)$$

$$L = \max_i \left( \sum_{j \in SC} a_{ij}^T \right), \quad (16)$$

where $a_{ij}^T$ = elements of $A^T$, where $i=1, \ldots, n$, $j=1, \ldots, n$;

L = max. number of non-zero coefficients in selected columns, $L \leq m$; and

SC = set of m selected columns (variables).

Third, out of all cyclically distinct dual solutions, the best ones are generally identified as having the highest ratio of m/L. Specifically, two sets of rules are used to identify the dominant solutions. According to the first set, solution F is considered to dominate solution G if:

$$SC_G \subset SC_F \text{ (implying } m_F > m_G\text{)} \quad (17a); \text{ and}$$

$$L_F = L_G \quad (17b)'$$

According to the second set of rules, solutions F and G are considered to dominate solution H if:

$$SC_H = SC_F + SC_G \text{ (implying } m_H = m_F + m_G\text{)} \quad (18a); \text{ and}$$

$$L_H = L_F + L_G \quad (18b).$$

Fourth, dominant dual solutions are rounded up to nearest integer values in order to develop a general expression for the value of W. To efficiently obtain an integer primal solution, the following constraint is added to the model. Addition of this constraint greatly improves computational performance.

$$\sum_{j=1}^{n} x_j \geq W. \quad (19)$$

Fifth, applying primal-dual complementary slackness relations to dominant dual solutions, closed form solutions to the primal problem can be derived.

Labor Scheduling Examples

Workforce days-off scheduling problems are practical and well-studied cyclic labor scheduling problems, which apply to organizations that operate seven days a week. Usually, the notation (u, 0 is used to denote the problem of assigning u consecutive work days out of a cycle of v days. In order to illustrate the cyclic combinatorial method, three days-off scheduling examples are used, including the (3,7), the (4,7), and the (5,7) problems, corresponding to three, four, and five consecutive workdays per week, respectively. Allowing only consecutive stretches of off-days in the weekly schedule, there are seven days-off patterns per week for each problem. Given varying labor demands for each day of the week, the objective is to determine how many employees to assign to each days-off pattern in order to satisfy labor demands with the minimum workforce size. Mathematically, the weekly days-off scheduling problem is represented by the following integer programming model:

$$\text{Minimize } Z = \sum_{j=1}^{7} x_j \quad (19)$$

$$\text{subject to } \sum_{j=1}^{7} a_{ij} x_j \geq r_i, \quad i = 1, 2, \ldots, 7 \quad (20)$$

$$x_j \geq 0 \text{ and integer}, \quad j = 1, 2, \ldots, 7 \quad (21)$$

where

Z=workforce size, i.e., total number of workers assigned;
$a_{ij}$=1 if day i is a workday for days-off pattern j, otherwise $a_{ij}$=0;
$r_i$=number of workers required on day i, i=1, 2, . . . , 7; and
$x_j$=number of workers assigned to weekly days-off pattern j.

The dual of the LP relaxation of the days-off scheduling model, with dual variables $y_1, \ldots, y_7$, is given by:

$$\text{maximize } W = \sum_{i=1}^{7} r_i y_i \quad (22)$$

subject to $$\sum_{i=1}^{7} a_{ij} y_i \leq 1, \quad j = 1, 2, \ldots, 7 \quad (23)$$

$$y_i \geq 0, \quad i = 1, 2, \ldots, 7. \quad (24)$$

Figure 1:
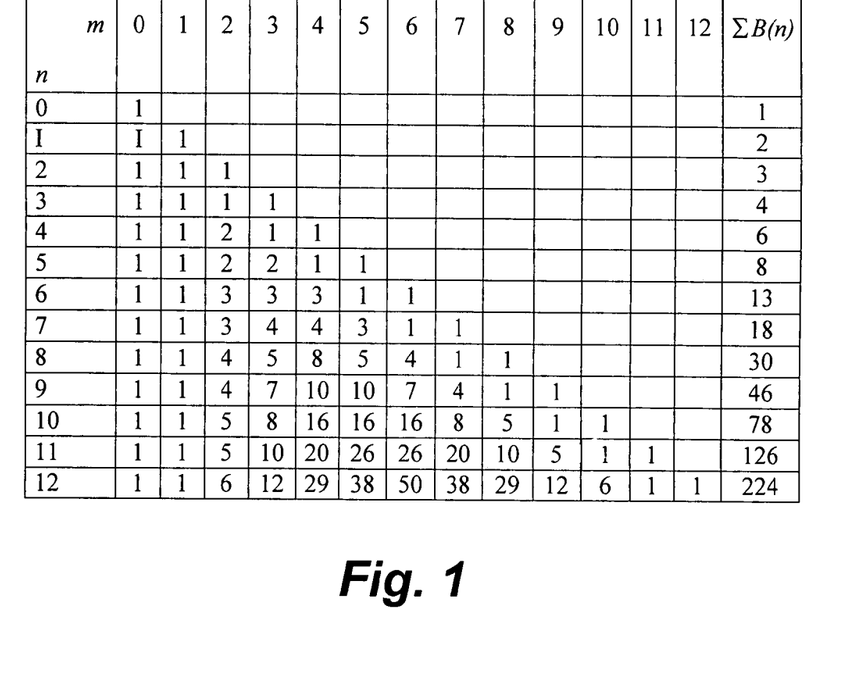
FIG. 1 is a table showing the solutions of an exemplary necklace problem using the cyclic combinatorial method according to the present invention where reverse cycles are considered equivalent to forward cycles.
Figure 2:
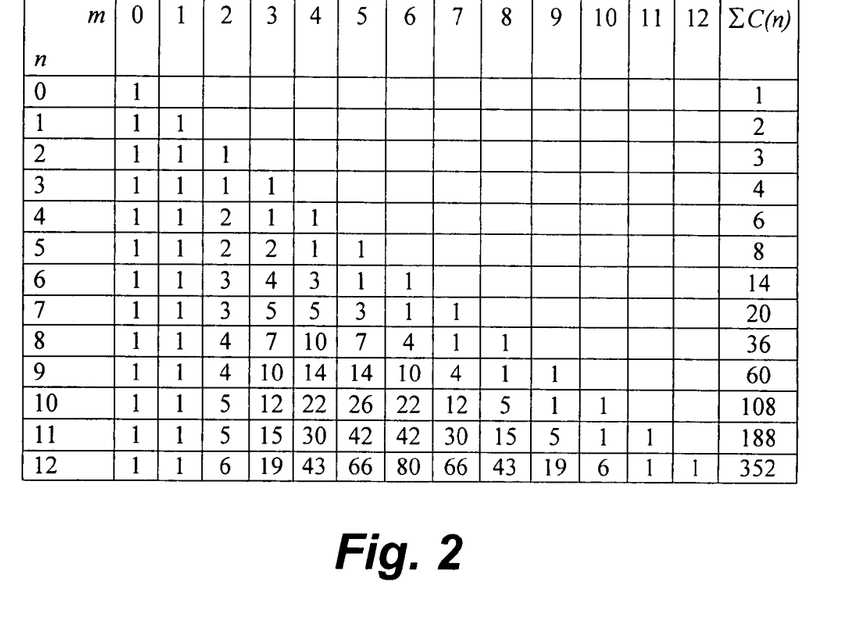
FIG. 2 is a table showing the solutions of an exemplary necklace problem using the cyclic combinatorial method according to the present invention where reverse cycles are not considered equivalent to forward cycles.

All feasible dual solutions are obtained by dividing the right-hand side of (23) among any m selected dual variables, where m=1, . . . , 7. Since the 0-1 patterns of the (3/4), (4/3), and (5/2) days-off scheduling problem are reversible (symmetric), the table of FIG. 1 is applicable. From FIG. 1, we know that the total number of cyclic selections out of 7 objects is equal to 18. Running program CYCLE for n=7, we obtain the 18 cyclic selections and corresponding dual solutions shown in the table of FIG. 3. Applying dominance criteria (17) and (18), we find out the dual solutions noted in bold in FIG. 3 that dominate all other solutions.

Figure 3:
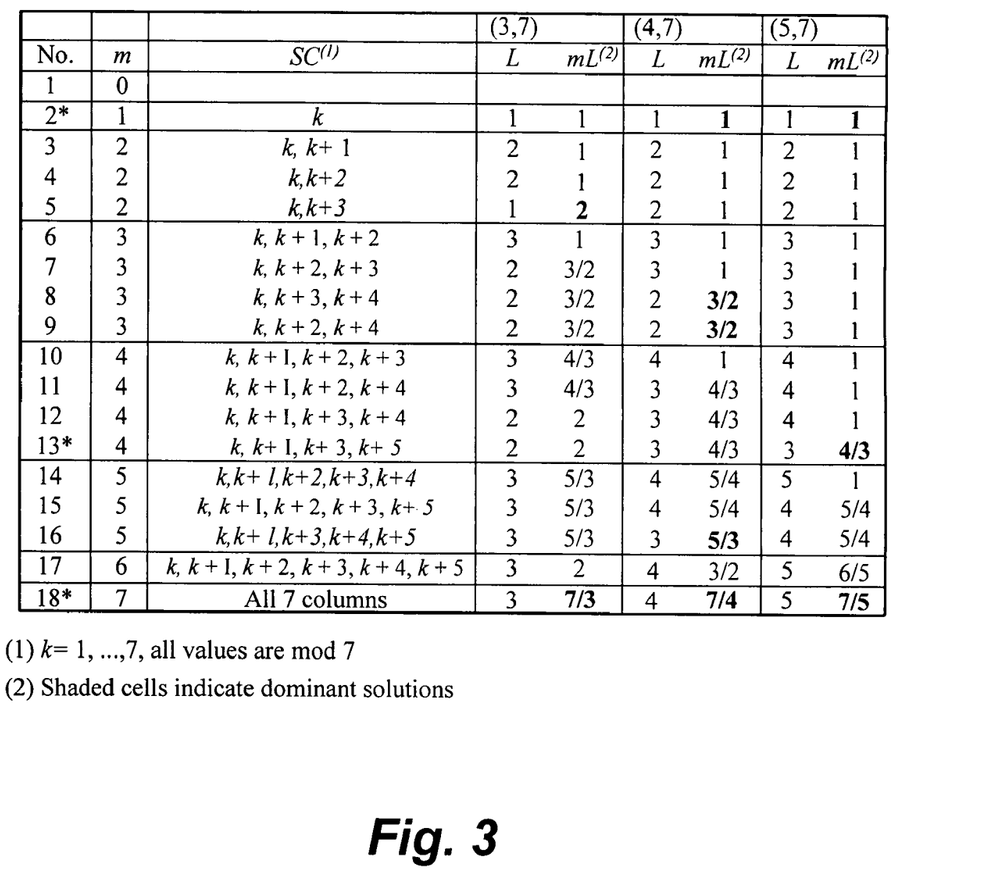
FIG. 3 is a table showing solutions to another cyclic combinatorial problem using the cyclic combinatorial method according to the present invention.

For each days-off problem, the minimum workforce size W is obtained by choosing the maximum value of the three solutions, and rounding up to integer values. The validity of rounding up dual continuous solutions to obtain optimum primal solutions is well known. Let $\lceil a \rceil$ denote the smallest integer greater than or equal to a, i.e., a rounded up to the nearest integer. Then, from the table shown in FIG. 3, the minimum workforce size W for each of the three days-off problems is given by:

$$W_{(3,7)} = \max\left\{\left\lceil \frac{1}{3} \sum_{i=1}^{7} r_i \right\rceil, Q_{max}\right\} \quad (25)$$

where $Q_{max} = \max_{i=1,\ldots,7} \{Q_i\}, \quad Q_i = r_i + r_{i+3(mod\ 7)}$ $$W_{(4,7)} = \max\left\{r_{max}, \left\lceil \frac{1}{4} \sum_{i=1}^{7} r_i \right\rceil, \left\lceil \frac{S_{max}}{3} \right\rceil, \left\lceil \frac{T_{max}}{2} \right\rceil, \left\lceil \frac{U_{max}}{2} \right\rceil\right\} \quad (26)$$

where $S_{max} = \max_{i=1,\ldots,7} \{S_i\},$ $S_i = r_i + r_{i+1(mod\ 7)} + r_{i+2(mod\ 7)} + r_{i+4(mod\ 7)} + r_{i+5(mod\ 7)}$ $T_{max} = \max_{i=1,\ldots,7} \{T_i\},$ $T_i = r_i + r_{i+1(mod\ 7)} + r_{i+4(mod\ 7)}$ $U_{max} = \max_{i=1,\ldots,7} \{U_i\},$ $U_i = r_i + r_{i+2(mod\ 7)} + r_{i+4(mod\ 7)}$ $$W_{(5,7)} = \max\left\{r_{max}, \left\lceil \frac{R_{max}}{3} \right\rceil, \left\lceil \frac{1}{5} \sum_{i=1}^{7} r_i \right\rceil\right\} \quad (27)$$

where $R_{max} = \max_{i=1,\ldots,7} \{R_i\},$ $R_i = r_i + r_{i+1(mod\ 7)} + r_{i+3(mod\ 7)} + r_{i+5(mod\ 7)}$ The above examples show the effectiveness of the cyclic selection algorithm in exploiting the cyclic nature of constraint matrices to dramatically reduce computational effort. Instead of going through 7!=5,040 linear combinations of the 7 dual variables, the optimum dual solutions are determined by enumerating only 18 cyclic combinations. The three days-off scheduling examples were purposefully chosen for their simplicity, in order to clearly illustrate the methodology. The method of the present invention is certainly not limited to this particular problem or to problems of similar size.

It is to be understood that the present invention is not limited to the embodiment described above, but encompasses any and all embodiments within the scope of the following claims.

I claim:

1. A cyclic combinatorial integer linear programming optimization method for optimizing constraint models in scheduling problems, comprising the steps of:
   identifying a linear objective function and its linear constraints for optimization;
   codifying the objective function and the linear constraints as a plurality of matrices and storing the plurality of matrices in computer readable memory;
   enumerating cyclically distinct combinations of basic dual variables related to any of the matrices having cyclic 0-1 properties so as to identify cyclically distinct solutions, wherein said enumerating includes using a procedure that generates monotonic partitions, said procedure comprising the steps of:

expressing a partition of a positive integer n into m parts (m≦n) as n=$V_1+V_2+\ldots+V_m$, where Vi>0, i=1, . . . , m;

denoting a number of unordered partitions of n into m parts by $P_m(n)$, such that $P_1(n)=P_n(n)=1$, $P_2(n)=\lfloor n/2 \rfloor$; and determining remaining values of $P_m(n)$ by means of the relationship $P_m(n)=P_1(n-m)+P_2(n-m)+\ldots+P_m(n-m)$ such that if n≦3, n−m≦1, or $v_m$, the current combination is stored in the computer readable memory and the next partition is processed;

applying a set of rules to the cyclically distinct solutions in order to provide a set of dominant solutions to thereby solve the problem; and displaying the set of dominant solutions to a user.

2. The cyclic combinatorial method according to claim 1, wherein the identifying and codifying steps further comprise the steps of:

expressing an ILP problem in the form of minimizing Z=$1^T$x subject to Ax≧r where x≧0 and integer, and A is a cyclic 0-1 matrix;

while ignoring integrality restrictions, constructing a dual LP model in the form of maximizing W=$r^T$y subject to $A^T$y≦1 where y≧0.

3. The cyclic combinatorial method according to claim 2, further comprising the steps of:

allocating right hand side of dual constraints $A^T$y≦1, which is equal to 1, among the dual variables (columns of $A^T$) in order to maximize the dual objective W in a way such that the unit resource is allocated among any number m of selected columns, where m=1, . . . , n; and specifying the dual solution by $y_i = \begin{cases} 1/L, & i \in SC \\ 0, & i \notin SC \end{cases}$, $W = \frac{1}{L}\sum_{i \in SC} r_i$, $L = \max_i \left( \sum_{j \in SC} a_{ij}^T \right)$, where $a_{ij}^T$ = elements of $A^T$, where i = 1, . . . , n, j = 1, . . . , n, L = max number of non-zero coefficients in selected columns, L≦m, SC=set of m selected columns (variables).

4. The cyclic combinatorial method according to claim 2, further comprising the steps of:

determining a next permutation of the m−1 remaining parts ($v_2, \ldots, v_m$), while fixing $v_1$;

cyclically comparing the resulting (current) combination (including $v_1$) with all stored combinations of the current partition;

storing the current combination and proceeding to a next permutation if the comparison step results in no match; and ignoring the current combination and proceeding to the next permutation if the comparison step results in a match.

5. The cyclic combinatorial method according to claim 4, further comprising the steps of:

using an adjacent-mark permutation procedure in the implementation of the optimization algorithm such that all sequences start with $v_1$ (the smallest partition); and constructing a forward sequence and a reverse sequence if a 0-1 matrix comprises reversible symmetric cycles.

6. The cyclic combinatorial method according to claim 1, wherein the rules application step further comprises the steps of:

utilizing a first rule wherein solution F dominates solution G if $SC_G \subset SC_F$ (implying $m_F > m_G$) and $L_F = L_G$;

utilizing a second rule wherein solutions F and G are considered to dominate solution H if $SC_H = SC_F + SC_G$ (implying $m_H = m_F + m_G$) and $L_H = L_F + L_G$;

rounding dominant dual solutions up to nearest integer values in order to develop a general expression for the value of W; and adding the constraint $$\sum_{j=1}^{n} x_j \geq W$$

W in order to efficiently obtain an integer primal solution to the problem; and applying primal-dual complementary slackness relations to the dominant dual solutions in order to derive closed-form solutions to the primal problem.

7. A computer software product that includes a medium readable by a processor, the medium having stored thereon a set of instructions for performing a cyclic combinatorial integer linear programming optimization method for optimizing constraint models in scheduling problems, the instructions comprising:

(a) a first set of instructions which, when loaded into main memory and executed by the processor, causes the processor to accept parameters related to a constraint model problem as inputs;

(b) a second set of instructions which, when loaded into main memory and executed by the processor, causes the processor to identify a linear objective function and its linear constraints for optimization;

(c) a third set of instructions which, when loaded into main memory and executed by the processor, causes the processor to codify the objective function and the linear constraints as a plurality of matrices;

(d) a fourth set of instructions which, when loaded into main memory and executed by the processor, causes the processor to enumerate cyclically distinct combinations of basic dual variables related to any of the matrices having cyclic 0-1 properties so as to identify cyclically distinct solutions, wherein said enumeration includes using a procedure that generates monotonic partitions, the procedure including the following steps:

expressing a partition of a positive integer n into in parts (m≦n) as n=$V_1+V_2+\ldots+V_m$, where Vi>0, i=1, . . . , m;

denoting number of unordered partitions of n into m parts by $P_m(n)$ such that $P_1(n)=P_n(n)=1$, $P_2(n)=\lfloor n/2 \rfloor$; and determining remaining values of $P_m(n)$ by means of the relationship $P_m(n)=P_1(n-m)+P_2(n-m)+\ldots+P_m(n-m)$ such that if n≦3, n−m≦1, or $v_1=v_m$, the current combination is stored and the next partition is processed;

(e) a fifth set of instructions which, when loaded into main memory and executed by the processor, causes the processor to apply a set of rules to the cyclically distinct solutions in order to provide a set of dominant solutions to thereby solve the problem; and (f) a sixth set of instructions which, when loaded into main memory and executed by the processor, causes the processor to display the set of dominant solutions on a display device of the machine.

8. The computer software product according to claim 7, wherein the identifying and codifying steps of the second and third sets of instructions further comprise:

(g) a seventh set of instructions which, when loaded into main memory and executed by the processor, causes the processor to express an ILP problem in the form of minimizing $Z=1^T x$ subject to $Ax \geq r$ where $x \geq 0$ and integer, and A is a cyclic 0-1 matrix; and (h) an eighth set of instructions which, when loaded into main memory and executed by the processor, causes the processor to construct a dual LP model in the form of maximizing $W=r^T y$ subject to $A^T y \leq 1$ where $y \geq 0$, while ignoring integrality restrictions.

9. The computer software product according to claim 8, further comprising:

(i) a ninth set of instructions which, when loaded into main memory and executed by the processor, causes the processor to determine a next permutation of the m−1 remaining parts $(v_2, \ldots, v_m)$, while fixing $v_1$;

(j) a tenth set of instructions which, when loaded into main memory and executed by the processor, causes the processor to cyclically compare the resulting (current) combination (including $v_1$) with all stored combinations of the current partition;

(k) an eleventh set of instructions which, when loaded into main memory and executed by the processor, causes the processor to store the current combination and proceeding to a next permutation if the comparison step results in no match; and (l) a twelfth set of instructions which, when loaded into main memory and executed by the processor, causes the processor to ignore the current combination and proceed to the next permutation if the comparison step results in a match.

10. The computer software product according to claim 9, further comprising:

(m) a thirteenth set of instructions which, when loaded into main memory and executed by the processor, causes the processor to use an adjacent-mark permutation procedure in the implementation of the optimization algorithm such that all sequences start with $v_1$ (the smallest partition); and (n) a fourteenth set of instructions which, when loaded into main memory and executed by the processor, causes the processor to construct a forward sequence and a reverse sequence if a 0-1 matrix comprises reversible symmetric cycles.

11. The computer software product according to claim 8, further comprising:

(o) a fifteenth set of instructions which, when loaded into main memory and executed by the processor, causes the processor to allocate right hand side of dual constraints $A^T y \leq 1$, which is equal to 1, among the dual variables (columns of $A^T$) in order to maximize the dual objective W in a way such that the unit resource is allocated among any number in of selected columns, where m=1, . . . , n; and (p) a fifteenth set of instructions which, when loaded into main memory and executed by the processor, causes the processor to specify the dual solution by $$y_i = \begin{cases} 1/L, & i \in SC \\ 0, & i \notin SC \end{cases}, \quad W = \frac{1}{L}\sum_{i \in SC} r_i,$$

$$L = \max_i \left( \sum_{j \in SC} a_{ij}^T \right), \text{ where } a_{ij}^T = \text{elements of } A^T,$$

where i=1, . . . , n, j=1, . . . , n, L=max number of non-zero coefficients in selected columns, L≤m, SC=set of m selected columns (variables).

12. The computer software product according to claim 7, wherein the fifth set of instructions further comprise:

(q) a sixteenth set of instructions which, when loaded into main memory and executed by the processor, causes the processor to utilize a first rule wherein solution F dominates solution G if $SC_G \subset SC_F$ (implying $m_F > m_G$) and $L_F = L_G$;

(r) a seventeenth set of instructions which, when loaded into main memory and executed by the processor, causes the processor to utilize a second rule wherein solutions F and G are considered to dominate solution H if $SC_H = SC_F + SC_G$ (implying $m_H = m_F + m_G$) and $L_H = L_F + L_G$;

(s) an eighteenth set of instructions which, when loaded into main memory and executed by the processor, causes the processor to round dominant dual solutions up to nearest integer values in order to develop a general expression for the value of W;

(t) a nineteenth set of instructions which, when loaded into main memory and executed by the processor, causes the processor to add the constraint $$\sum_{j=1}^{n} x_j \geq W$$

order to efficiently obtain an integer primal solution to the problem; and (u) a twentieth set of instructions which, when loaded into main memory and executed by the processor, causes the processor to apply primal-dual complementary slackness relations to the dominant dual solutions in order to derive closed-form solutions to the primal problem.

13. A system for performing cyclic combinatorial integer linear programming optimization for optimizing constraint models in scheduling problems, the system comprising:

a processor;

computer readable memory coupled to the processor;

a user interface coupled to the processor;

a display coupled to the processor; and software stored in the memory and executable by the processor, the software having:

means for accepting parameters related to the problem as system inputs;

means for identifying a linear objective function and its linear constraints for optimization;

means for codifying the objective function and the linear constraints as a plurality of matrices;

means for enumerating cyclically distinct combinations of basic dual variables related to any of the matrices having cyclic 0-1 properties so as to identify cyclically distinct solutions;

means for applying a set of rules to the cyclically distinct solutions in order to provide a set of dominant solutions to thereby solve the problem, wherein said means comprise means for identifying cyclically-distinct dual solutions having a highest ratio being determined by a quantity of m selected columns of the matrices divided by a quantity of L, the quantity of L representing the maximum number of non-zero coefficients in the selected columns of the matrices; and means for displaying the set of dominant solutions to a user of the system.

\* \* \* \* \*